United States Patent [19]

Tada et al.

[11] Patent Number: 5,446,802
[45] Date of Patent: Aug. 29, 1995

[54] IMAGE PROCESSING APPARATUS COMPRISING JUDGEMENT MEANS FOR JUDGING DOT PHOTOGRAPH IMAGE, PHOTOGRAPH IMAGE AND CHARACTER IMAGE

[75] Inventors: Kaoru Tada, Aichi; Hideo Kumashiro, Toyokawa; Hiroya Sugawa, Toyokawa; Shigeru Moriya, Toyokawa; Hiroshi Murakami, Toyokawa, all of Japan

[73] Assignee: Minolta Camera Kabushiki Kaisha, Osaka, Japan

[21] Appl. No.: 262,392

[22] Filed: Jun. 20, 1994

Related U.S. Application Data

[63] Continuation of Ser. No. 941,921, Sep. 8, 1992, abandoned.

[30] Foreign Application Priority Data

Sep. 5, 1991 [JP] Japan .................................. 3-225737

[51] Int. Cl.⁶ .............................................. G06K 9/00
[52] U.S. Cl. ................................................... 382/170
[58] Field of Search ..................................... 382/50–54, 382/56; 358/455, 462, 464–466, 467; G06K 9/38, 9/40, 9/36, 9/46; H04N 1/40, 1/04

[56] References Cited

U.S. PATENT DOCUMENTS

| | | |
|---|---|---|
| 4,709,274 | 11/1987 | Tanioka et al. ................. 382/53 |
| 4,710,822 | 12/1987 | Matsunawa ..................... 382/53 |
| 4,797,943 | 1/1989 | Murayama et al. ............. 382/53 |
| 4,905,294 | 2/1990 | Sugiura et al. ................. 382/53 |
| 5,001,767 | 3/1991 | Yoneda et al. ................. 382/53 |
| 5,025,481 | 6/1991 | Ohuchi ............................ 382/53 |

FOREIGN PATENT DOCUMENTS

| | | |
|---|---|---|
| 63-21874 | 2/1988 | Japan . |
| 2-219366 | 8/1990 | Japan . |

*Primary Examiner*—Jose L. Couso
*Attorney, Agent, or Firm*—Burns, Doane, Swecker & Mathis

[57] ABSTRACT

In an image processing apparatus, first peak density pixels of one dimension each having a peak density in one-dimension direction larger than a predetermined density are detected from image data located in a predetermined image area of a document image, and second peak density pixels of two dimensions each having peak densities in two-dimension directions larger than the predetermined density are detected from the image data. Further, there are counted a number of the detected first peak density pixels of one dimension and a number of the detected second peak density pixels of two dimensions, and then, it is judged whether or not the image data located in the predetermined image area are image data of a dot photograph image, a photograph image or a character image based on the counted numbers.

41 Claims, 17 Drawing Sheets

Peak density pixels of one dimension

Peak density pixels of two dimensions

Peak density pixels of one dimension

Peak density pixels of two dimensions

Peak density pixels of one dimension

Peak density pixels of two dimensions

IMAGE PROCESSING APPARATUS COMPRISING JUDGEMENT MEANS FOR JUDGING DOT PHOTOGRAPH IMAGE, PHOTOGRAPH IMAGE AND CHARACTER IMAGE

This application is a continuation of application Ser. No. 07/941,921, filed Sep. 8, 1992, now abandoned.

BACKGROUND OF THE INVENTION

1. Field of the Invention

The present invention relates to an image processing apparatus comprising judgment means for judging a dot photograph image, a photograph image or a character image and more particularly, to an image processing apparatus comprising judgment means for judging a dot photograph image, a photograph image or a character image based a counted value of a number of pixels each having a peak density in one-dimension direction larger than a predetermined threshold density (each pixel is referred to as a peak density pixel of one dimension hereinafter) and a counted value of a number of pixels each having peak densities in two-dimension directions larger than the predetermined threshold density (each pixel is referred to as a peak density pixel of two dimensions hereinafter).

2. Description of the Prior Art

The modulation transfer function (MTF) correction process provided for improving reproductivity of fine lines and preventing generation of Moire and the binarizing process for converting multi-value image data to binary image data in representation of pseudo gradation may lead to relatively large influence to the quality of image to be processed. Since binarizing processes suitable for attributes of documents of a character image, a photograph image and a dot photograph image are different from each other upon performing the above-mentioned processes, one suitable binarizing process is selected among these binarizing processes based on judgment results obtained by judgment of the attribute of the document. This selection has been used in an image processing apparatus such as a digital copying machine or the like. Therefore, the technique for detecting the attribute of the image located in a predetermined area within the document is very important.

Conventionally, a method of detecting a dot photograph image area using an autocorrelation function is suggested in the Japanese patent laid-open publication No. 59-182670/1984. In this detection method, first of all, there is calculated a coefficient Ps(i, j) of an autocorrelation function of image data located in a predetermined image area using the following equation.

$$Ps(i, j) = \frac{\sum\limits_{x=1}^{n} \sum\limits_{y=1}^{m} Is(x, y) \cdot Is(i + x, j + y)}{n \cdot m}$$

where Is (x, y) is image data in an n×m matrix.

If the calculated coefficient Ps(i, j) is equal to or larger than a predetermined threshold value, the image of the image data is judged as a dot photograph image area. On the other hand, if the calculated coefficient Ps(i, j) is smaller than the predetermined threshold value, the image of the image data is judged as an area other than the dot photograph image area.

Further, there is suggested another method of detecting a dot photograph image area in the Japanese patent laid-open publication No. 63-28174/1988. In this method, there is detected a pitch of a dot photograph image using the above-mentioned method, a set of filtering coefficients for a spatial filtering process is selected among a plurality of sets of filtering coefficients based on the detected pitch, and then, a spatial filtering process is performed using the selected set of filtering coefficients.

However, in the above-mentioned methods each of detecting a dot photograph image area, it takes an extremely long time to perform the above-mentioned calculation, and it is necessary to provide a memory having a relatively large memory capacity.

SUMMARY OF THE INVENTION

An object of the present invention is therefore to provide an image processing apparatus having a structure simpler than that of the conventional apparatus, capable of judging a dot photograph image.

Another object of the present invention is to provide an image processing apparatus capable of judging a dot photograph image with a memory having a smaller memory capacity, in a speed higher than that of the conventional apparatus.

A further object of the present invention is to provide an image processing apparatus having a structure simpler than that of the conventional apparatus, capable of judging a photograph image.

A still further object of the present invention is to provide an image processing apparatus capable of judging a photograph image with a memory having a smaller memory capacity, in a speed higher than that of the conventional apparatus.

A still more further object of the present invention is to provide an image processing apparatus having a structure simpler than that of the conventional apparatus, capable of judging a character image.

A still further object of the present invention is to provide an image processing apparatus capable of judging a character image with a memory having a smaller memory capacity, in a speed higher than that of the conventional apparatus.

In order to achieve the aforementioned objective, according to one aspect of the present invention, there is provided an image processing apparatus comprising:

first pixel detecting means for detecting first peak density pixels of one dimension each having a peak density in one-dimension direction larger than a predetermined density from image data located in a predetermined image area of a document image;

second pixel detecting means for detecting second peak density pixels of two dimensions each having peak densities in two-dimension directions larger than the predetermined density from said image data;

first counting means for counting a number of said first peak density pixels of one dimension detected by said first pixel detecting means;

second counting means for counting a number of said second peak density pixels of two dimensions detected by said second pixel detecting means; and judging means for judging whether or not said image data located in said predetermined image area are image data of a dot photograph image, based on said number counted by said first counting means and said number counted by said second counting means.

According to another aspect of the present invention, there is provided an image processing apparatus comprising:

first pixel detecting means for detecting first peak density pixels of one dimension each having a peak density in one-dimension direction larger than a predetermined density from image data located in a predetermined image area of a document image;

second pixel detecting means for detecting second peak density pixels of two dimensions each having peak densities in two-dimension directions larger than the predetermined density from said image data;

first counting means for counting a number of said first peak density pixels of one dimension detected by said first pixel detecting means;

second counting means for counting a number of said second peak density pixels of two dimensions detected by said second pixel detecting means; and judging means for judging whether or not said image data located in said predetermined image area are image data of a character image, based on said number counted by said first counting means and said number counted by said second counting means.

According to a further aspect of the present invention, there is provided an image processing apparatus comprising:

first pixel detecting means for detecting first peak density pixels of one dimension each having a peak density in one-dimension direction larger than a predetermined density from image data located in a predetermined image area of a document image;

second pixel detecting means for detecting second peak density pixels of two dimensions each having peak densities in two-dimension directions larger than the predetermined density from said image data;

first counting means for counting a number of said first peak density pixels of one dimension detected by said first pixel detecting means;

second counting means for counting a number of said second peak density pixels of two dimensions detected by said second pixel detecting means; and judging means for judging whether or not said image data located in said predetermined image area are image data of a photograph image, by comparing the number counted by said first counting means with a predetermined first threshold value and comparing the number counted by said second counting means with a predetermined second threshold value.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 6b is a front view showing movement of the window shown in FIG. 6a;

FIG. 10b is a graph showing a density of the character image shown in FIG. 10a on a position along a line L1–L1' shown in FIG. 10a;

FIG. 11a is a front view showing peak density pixels of one dimension obtained by executing a subroutine process of step S200 for the character image shown in FIG. 10a;

FIG. 11b is a front view showing peak density pixels of two dimensions obtained by executing another subroutine process of step S300 for the character image shown in FIG. 10a;

FIG. 12b is a graph showing a density of the dot photograph image shown in FIG. 12a on a position along a line L2–L2' shown in FIG. 12a;

FIG. 13a is a front view showing peak density pixels of one dimension obtained by executing the subroutine process of step S200 for the dot photograph image shown in FIG. 12a;

FIG. 13b is a front view showing peak density pixels of two dimensions obtained by executing the subroutine process of step S300 for the dot photograph image shown in FIG. 12a;

FIG. 14b is a graph showing a density of the photograph image shown in FIG. 14a on a position along a line L3–L3' shown in FIG. 14a;

FIG. 15a is a front view showing peak density pixels of one dimension obtained by executing the subroutine process of step S200 for the photograph image shown in FIG. 14a;

FIG. 15b is a front view showing peak density pixels of two dimensions obtained by executing the subroutine process of step S300 for the photograph image shown in FIG. 14a;

DETAILED DESCRIPTION OF THE PREFERRED EMBODIMENTS

An image processing apparatus of a preferred embodiment according to the present invention will be described below in an order of the following items with reference to the attached drawings.

(1) Composition of Image processing apparatus
(2) Controller of Image processing apparatus
(3) Image processor
   (3-1) Composition of Image processor
   (3-2) Area judgment section
      (3-2-1) Main routine
      (3-2-2) Process for counting a number of peak density pixels of one dimension
      (3-2-3) Process for counting a number of peak density pixels of two dimensions
      (3-2-4) Area judgment process
      (3-2-5) Examples of Area judgment
      (3-2-6) Modification of Area judgment process

(1) Composition of Image Processing Apparatus

Figure 1:
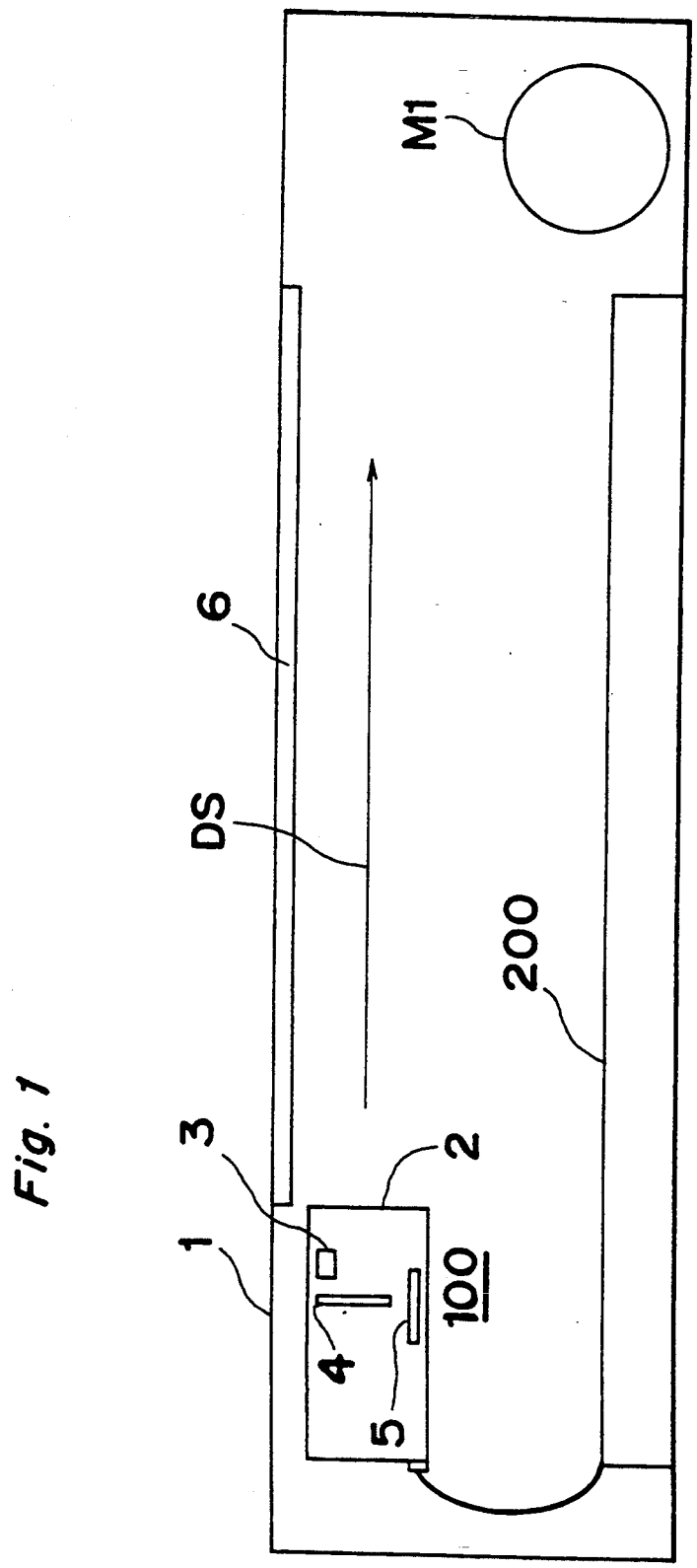
FIG. 1 is a longitudinal cross-sectional view showing a mechanical system of an image processing apparatus according to the present invention.

FIG. 1 shows a mechanical system of an image processing apparatus 1 according to the present invention.

Referring to FIG. 1, the image processing apparatus 1 is mainly divided to a CCD image reader 100 for reading an image of a document (referred to as a document image hereinafter) and converting the read document image into image data, and an image processor 200 for processing the converted image data in a manner described later.

A scanner 2 provided in the CCD image reader 100 comprises an exposure lamp 3 for projecting light onto a document, an array of rod lenses 4 for condensing a reflected light from the document, and a contact type CCD image sensor 5 for converting the condensed light into an electric signal. Upon reading a document, the scanner 2 is driven by a motor M1 to be moved in a subscan direction indicated by an arrow DS and to scan the document set on a platen glass 6. The document image projected by the exposure lamp 3 is converted into image data composed of electrical signals by the CCD image sensor 5 with electrically scanning them in a main scan direction perpendicular to the subscan direction.

The image data of the document image from the CCD image sensor 5 are inputted to the image processor 200. The image processor 200 judges a character image area, a dot photograph image area and a photograph image area in the document image, and then, performs an MTF correction process and a binarizing process to convert multi-value image data into binary image data.

(2) Controller of Image Processing Apparatus

Figure 2:
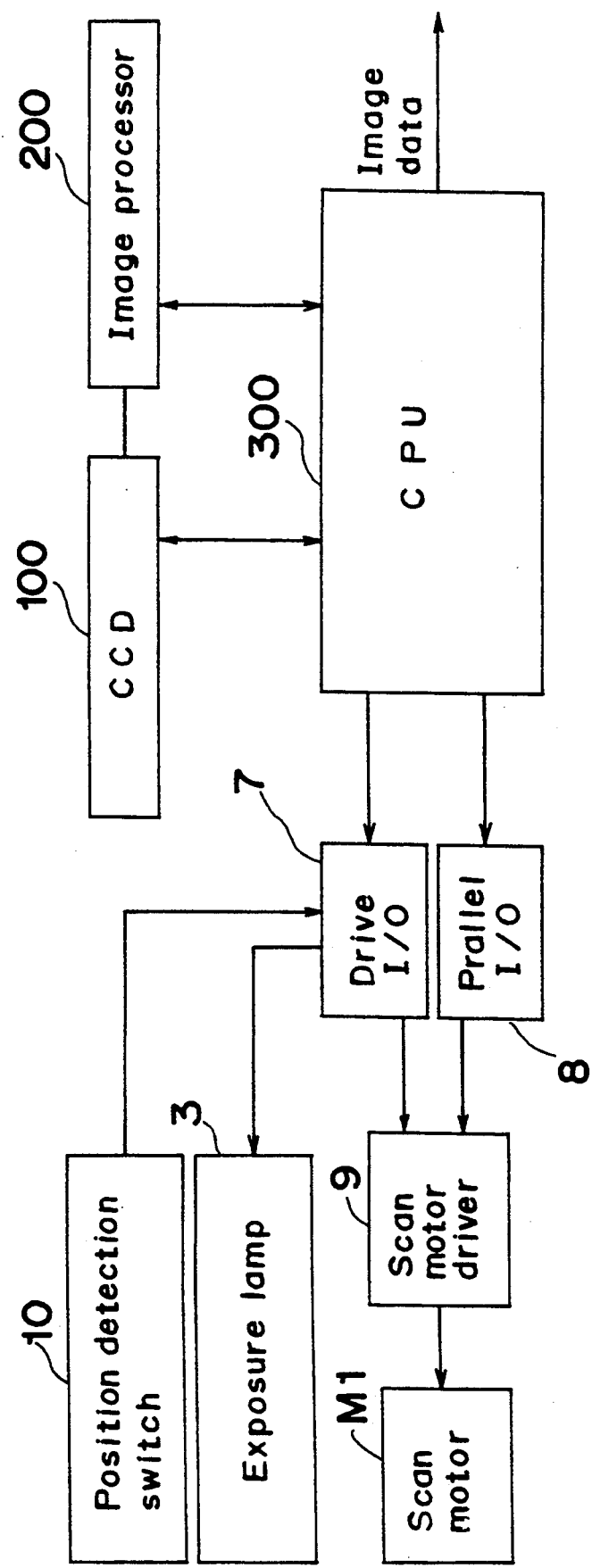
FIG. 2 is a schematic block diagram showing a composition of a controller of the image processing apparatus shown in FIG. 1.

FIG. 2 shows a composition of a controller of the image processing apparatus shown in FIG. 1.

Referring to FIG. 2, the CCD image reader 100 is controlled by a CPU 300 provided in the image processor 200. Based on a position signal representing a position of a document on the platen glass 6 outputted from a position detecting switch 10, the CPU 300 controls the exposure lamp 3 through a drive input and output interface (referred to as a drive I/O hereinafter) 7 and also controls a scan motor driver 9 through the drive I/O 7 and a parallel input and output interface (referred to as a parallel I/O hereinafter) 8. Further, a scan motor M1 is driven by the scan motor driver 9.

Further, the CPU 300 is connected to the CCD image reader 100 and the image processor 200 through buses, respectively. Image data converted from the document image by the CCD image sensor 5 are inputted to the image processor 200 which will be described in detail later. Further, the image processor 200 processes the inputted image data in a manner as described later and outputs the processed image data to a printer and a CRT display unit (both not shown).

(3) Image Processor

(3-1) Composition of Image Processor

Figure 3:
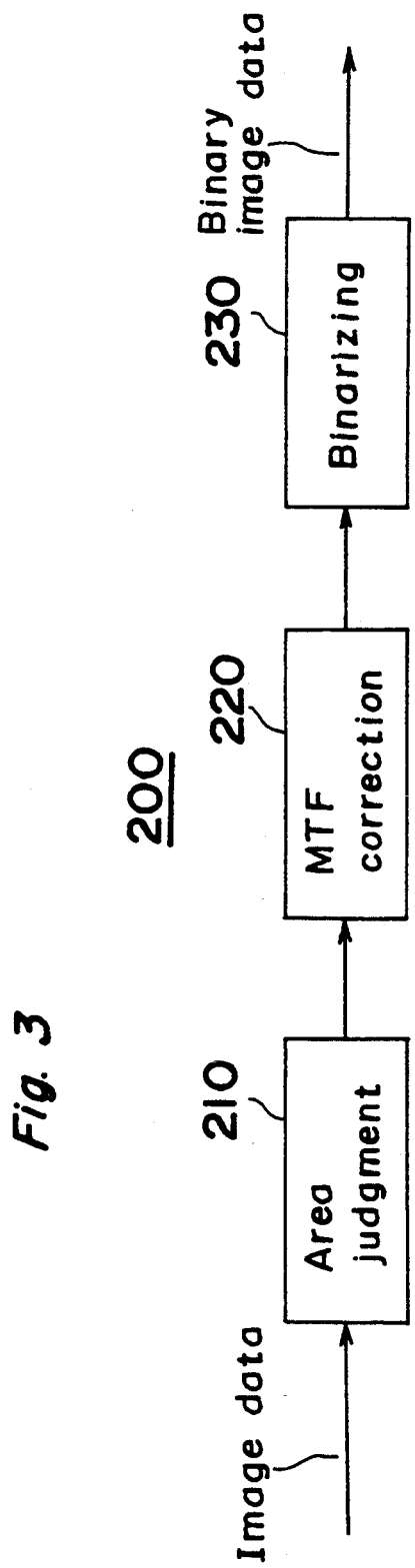
FIG. 3 is a schematic block diagram showing a composition of an image processor shown in FIG. 2.

FIG. 3 shows a composition of the image processor 200 shown in FIG. 2.

Referring to FIG. 3, the image processor 200 comprises an area judgment section 210, a modulation transfer function section (referred to as an MTF correction section hereinafter) 220, and a binarizing section 230.

Figure 4:
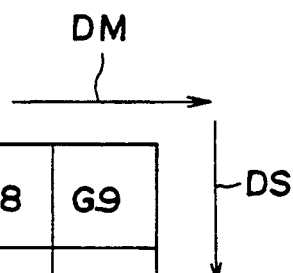
FIG. 4 is a front view showing judgment areas G1 to G81 divided in a predetermined manner which are used in the image processing apparatus shown in FIGS. 1 and 2.
Figure 16:
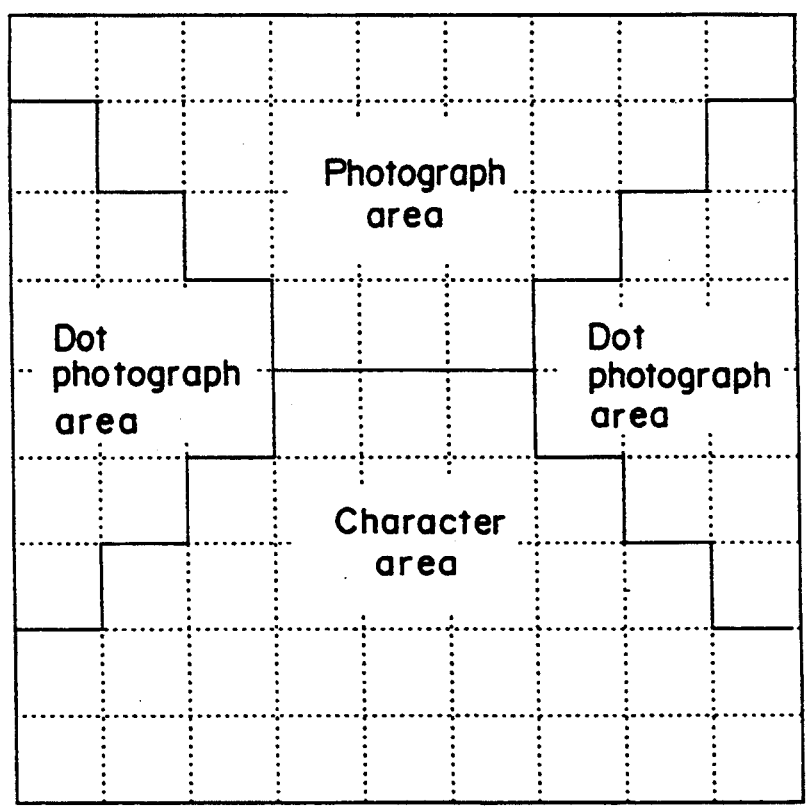
FIG. 16 is a front view showing areas including a photograph image area, dot photograph image areas and a character image area which is obtained by the image processing apparatus shown in FIGS. 1 and 2.

The image data of the document image converted by the CCD image sensor 5 are inputted to the area judgment section 210. The inputted image data are divided in a 9×9 matrix into 81 image data of predetermined judgment areas G1 to G81 (referred to as judgment areas hereinafter) as shown in FIG. 4. In FIG. 4, DM denotes the main scan direction and DS denotes the subscan direction. An attribute of each judgment area such as a character, a photograph or a dot photograph is judged or detected based on a number of peak density pixels of one dimension counted in each judgment area and a number of peak density pixels of two dimensions counted in each judgment area. After this area judgment, the inputted image data are outputted together with attribute signals for respective judgment areas as shown in FIG. 16.

In the present preferred embodiment, the inputted image data are divided in the matrix into a plurality of image data of predetermined judgment areas. However, the present invention is not limited to this, and the area judgment process may be performed moving a window representing a judgment area in the main scan direction and the subscan direction by several pixels.

Further, in the present preferred embodiment, the inputted image data are outputted together with attribute signals for respective pixels.

The MTF correction section 220 performs not only an edge emphasis process for improving an apparent resolution of an image and improving reproductivity of fine lines but also a smoothing process for preventing Moire phenomenon generated on the binarizing process performed at the later stage and reducing noise components included in the image data. In the MTF correction process, a set of filtering coefficients of an MTF correction filter is altered by changing respective filtering coefficients of two filters or changing a mixed ratio of the two filters. In the present preferred embodiment, a set of filtering coefficients is determined according to the attribute signal representing a character image, a photograph image or a dot photograph image outputted from the area judgment section 210.

Further, the binarizing section 230 converts the multi-value image data from the MTF correction section 220 into binary image data of white or black, using a directly binarizing circuit for converting multi-value image data into binary image data using a threshold value suitable for the character image, a density pattern binarizing circuit suitable for the photograph image, and an error diffusion binarizing circuit for binarizing image data without Moire. Among these three binarizing circuits, one binarizing circuit is selected and used based on the attribute signal of the document image outputted from the area judgment section 210.

(3-2) Area Judgment Section (3-2-1) Main Routine

Figure 5:
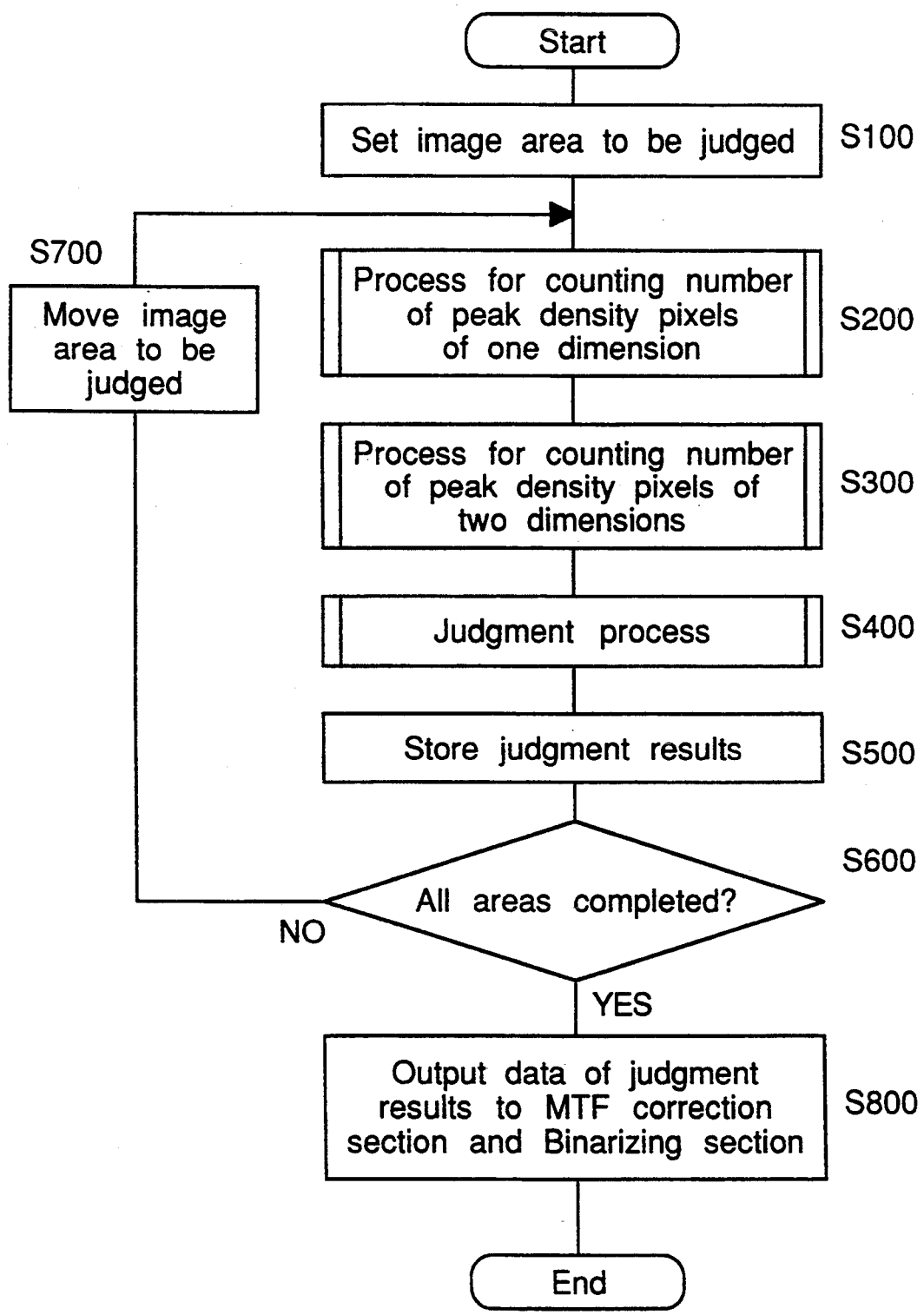
FIG. 5 is a flow chart showing a main routine executed by an area judgment section shown in FIG. 3.

FIG. 5 is a flow chart showing a main routine executed by the area judgment section 210 shown in FIG. 3.

Referring to FIG. 5, first of all, the image data of the document image inputted to the area judgment section 210 are divided at step S100 in the 9×9 matrix into image data in the 81 judgement areas G1 to G81, as shown in FIG. 4, in order to set image data in the 81 judgment areas to be judged. Thereafter, there is performed at step S200 a process for counting a number of peak density pixels of one dimension in the first judgment area G1 wherein each of peak density pixels has a peak density in one-dimension direction of the main scan direction larger than a predetermined threshold density, and then, there is performed at step S300 a process for counting a number of peak density pixels of two dimensions in the first judgment area G1 wherein each of peak density pixels has peak densities in two-dimension directions of the main scan and subscan directions larger than the predetermined threshold density.

Thereafter, there is performed at step S400 a judgment process for judging or detecting whether the image of the first judgment area G1 is a dot photograph image, a character image or a photograph image based on the counted number of the peak density pixels of one dimension at step 200 and the counted number of the peak density pixels of two dimensions at step 300, and then, there is generated an attribute signal representing the judgment result. Then, the attribute signal with respect to the first judgment area G1 is temporarily stored at step S500.

After step S500, it is judged at step S600 whether or not the judgment process for all the judgment areas is completed. If NO at step S600, the program flow proceeds to step S700, and then, the judgment area is moved to be replaced with another judgment area and the program flow proceeds to step S200. On the other hand, if YES at step S600, the program flow proceeds to step S800. Accordingly, the judgment area is moved in an order of the judgment areas G1 to G81 shown in FIG. 4 and the above-mentioned processes of steps S200 to S500 are repeatedly performed for respective judgment areas.

After completion of the judgment process for all the judgment areas G1 to G81, the image data of the document are outputted at step S800 to the MTF correction section 220 and the binarizing section 230 together with the attribute signals representing the judgment results for respective areas G1 to G81, and then, the main routine is completed.

(3-2-2) Process for Counting a Number of Peak Density Pixels of One Dimension

Figure 7:
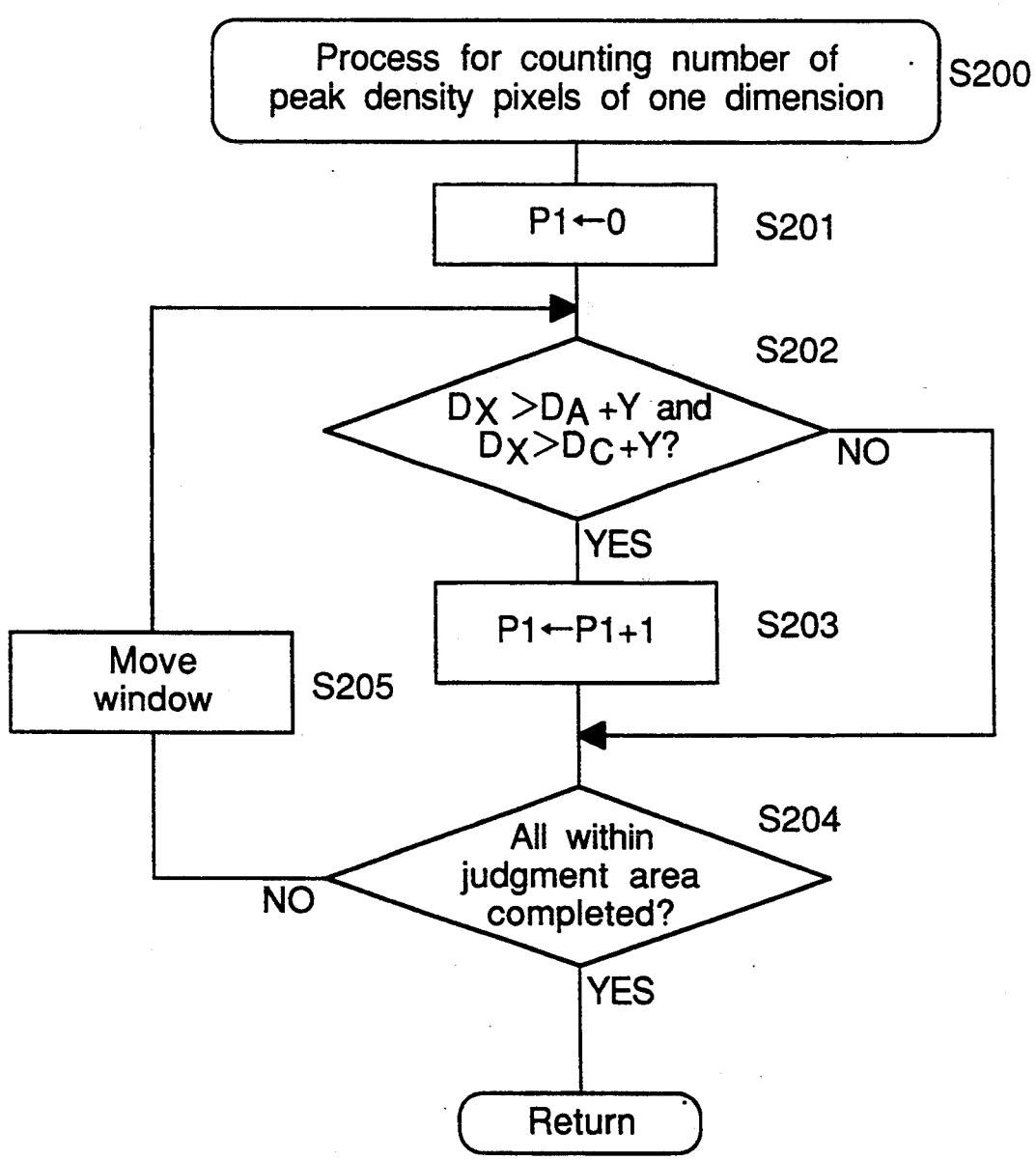
FIG. 7 is a flow chart showing a process for counting a number of peak density pixels of one dimension of a subroutine shown in FIG. 5.

FIG. 7 is a flow chart showing a process for counting a number of peak density pixels of one dimension, of a subroutine of step S200 for each judgment area G1, G2, ..., or G81 which is shown in FIG. 5.

Figure 6A:
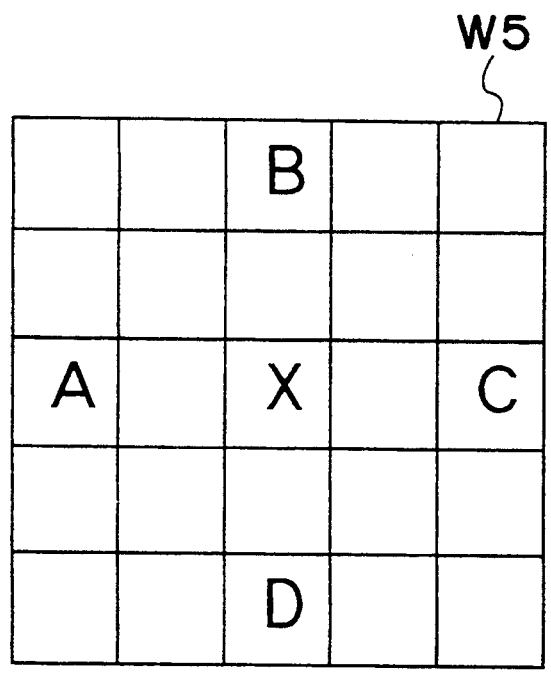
FIG. 6a is a front view showing a window having a matrix shape to be processed.

In the present preferred embodiment, there is used a window W5 in a 5×5 matrix for the image in the predetermined judgment area, as shown in FIG. 6a. Referring to FIG. 6a, there are used in the 5×5 matrix the center pixel and the four peripheral pixels, i.e., the center pixel or specified pixel X having a density value $D_X$ located at (3, 3) to be processed, the top center pixel B having a density value $D_B$ located at (3, 1), the bottom center pixel D having a density value $D_D$ located at (3, 5), the leftmost center pixel A having a density value $D_A$ located at (1, 3), and the rightmost center pixel C having a density value $D_C$ located at (5, 3). As is apparent from FIG. 6a, the pixels A, X and C are located on the third line in the main scan direction, and the pixels B, X and D are located on the third line in the subscan direction.

Referring to FIG. 7, first of all, after initializing a count parameter P1 of one dimension to zero at step S201, it is judged at step S202 whether or not (a) the density value $D_X$ of the center pixel X is larger than the sum of the density value $D_A$ of the leftmost center pixel A and a predetermined value Y and (b) the density value $D_X$ of the center pixel X is larger than the sum of the density value $D_C$ of the rightmost center pixel C and the predetermined value Y.

In the present preferred embodiment, the comparison is performed as described above, however, the present invention is not limited to this. It may be judged at step S202 whether or not (a) the density value $D_X$ of the center pixel X is larger than the sum of the density value $D_B$ of the top center pixel B and the predetermined value Y, and (b) the density value $D_X$ of the center pixel X is larger than the sum of the density value $D_D$ of the bottom center pixel D and the predetermined value Y.

If YES at step S202, the program flow proceeds to step S203, and then, one is added to the count parameter P1 and the sum thereof is set as the parameter P1 to count the center pixel X or the specified pixel as the peak density pixel of one dimension having a peak density in one-dimension direction (in the main scan direction in the present preferred embodiment). Then, the program flow proceeds to step S204. On the other hand, if NO at step S202, the program flow directly proceeds to step S204.

Thereafter, it is judged at step S204 whether or not the comparison process of step S202 for all the pixels within the specified judgment area is completed. If YES at step S204, the program flow returns to the original main routine.

Figure 6B:
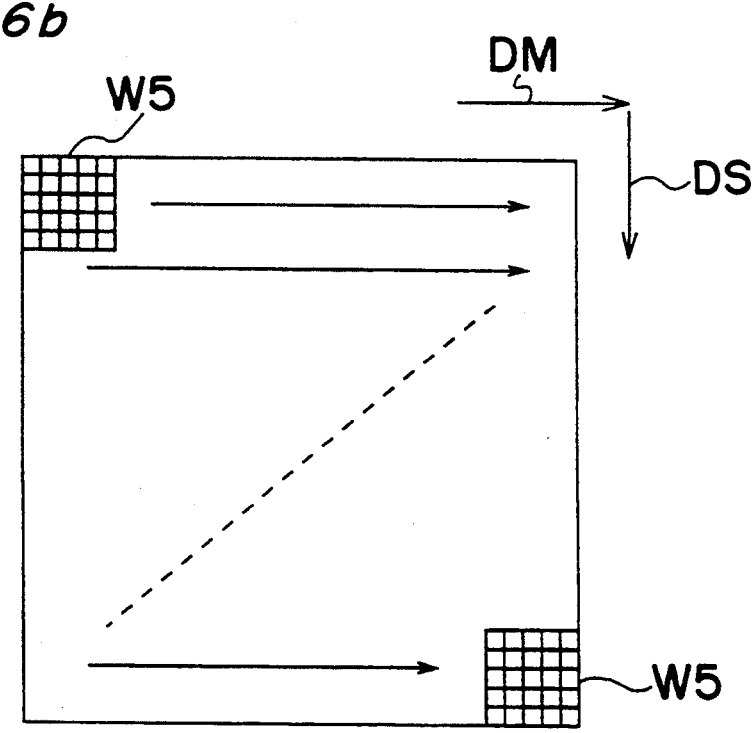

On the other hand, if NO at step S204, the program flow proceeds to step S205, the matrix window W5 is moved by one pixel in the main scan direction DM as shown in FIG. 6b, and if the matrix window W5 is located at the rightmost position, the matrix window W5 is moved to the leftmost position on the next subscan line shifted by one pixel in the subscan direction DS from the subscan line of the present position as shown in FIG. 6b. Then, the program flow proceeds to step S202, and then, the processes of steps S202 and S203 are performed for respective pixels within the specified judgment area until the matrix window W5 reaches the last position or the bottom rightmost position on the bottom subscan line. Accordingly, as shown in FIG. 6b, when the matrix window W5 is moved from the top leftmost position on the top main scan line to the bottom rightmost position on the bottom main scan line, the processes of steps S202 and S203 are repeatedly performed for respective pixels.

The detection of the peak density pixel of one dimension is performed as described above, however, the present invention is not limited to this. The peak density pixel of one dimension may detected by calculating a differential value of the density value in the subscan direction or the main direction.

(3-2-3) Process for Counting a Number of Peak Density Pixels of Two Dimensions

Figure 8:
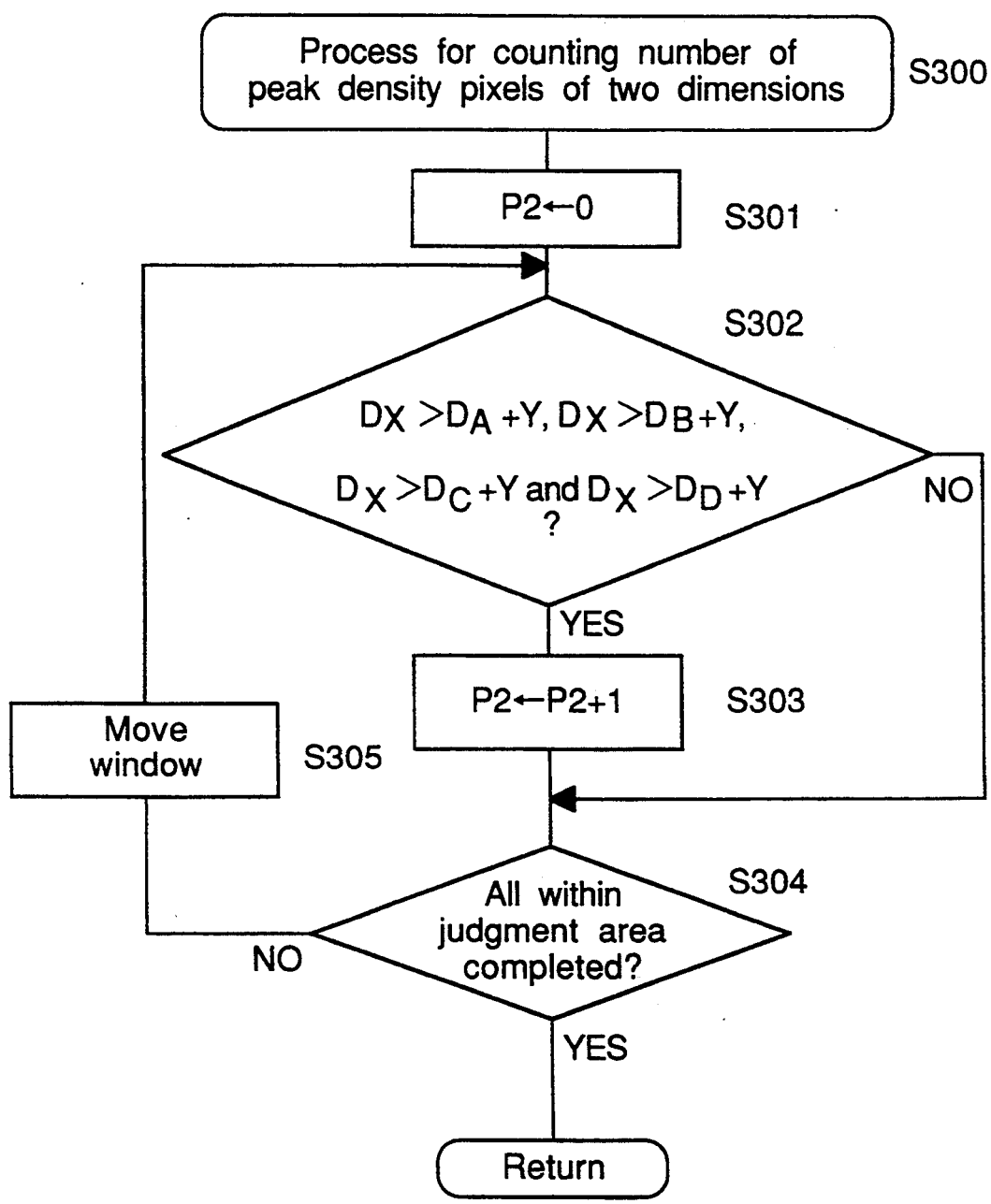
FIG. 8 is a flow chart showing a process for counting a number of peak density pixels of two dimensions of a subroutine shown in FIG. 5.

FIG. 8 is a flow chart showing a process for counting a number of peak density pixels of two dimensions, of a subroutine of step S300 for each judgment area G1, G2, ..., or G81 which is shown in FIG. 5. In this process, there is also used the above-mentioned matrix window W5 shown in FIG. 6a.

Referring to FIG. 8, first of all, after initializing a count parameter P2 of two dimensions to zero at step S301, it is judged at step S302 whether or not (a) the density value $D_X$ of the center pixel X is larger than the sum of the density value $D_A$ of the leftmost center pixel A and the predetermined value Y, (b) the density value $D_X$ of the center pixel X is larger than the sum of the density value $D_B$ of the top center pixel B and the predetermined value Y, (c) the density value $D_X$ of the center pixel X is larger than the sum of the density value $D_C$ of the rightmost center pixel C and the predetermined value Y, and (d) the density value $D_X$ of the center pixel X is larger than the sum of the density value $D_D$ of the bottom center pixel D and the predetermined value Y.

If YES at step S302, the program flow proceeds to step S303, and then, one is added to the count parameter P2 and the sum thereof is set as the parameter P2 to count the center pixel X or the specified pixel as the peak density pixel of two dimensions having peak densities in two-dimension directions (in the main scan direction and the subscan direction in the present preferred embodiment). Then, the program flow proceeds to step S304. On the other hand, if NO at step S302, the program flow directly proceeds to step S304.

Thereafter, it is judged at step S304 whether or not the comparison process of step S302 for all the pixels within the specified judgment area is completed. If YES at step S304, the program flow returns to the original main routine.

On the other hand, if NO at step S304, the program flow proceeds to step S305, the matrix window W5 is moved by one pixel in the main scan direction DM as shown in FIG. 6b, and if the matrix window W5 is located at the rightmost position, the matrix window W5 is moved to the leftmost position on the next subscan line shifted by one pixel in the subscan direction DS from the subscan line of the present position as shown in FIG. 6b. Then, the program flow proceeds to step S302, and then, the processes of steps S302 and S303 are performed for respective pixels within the specified judgment area until the matrix window W5 reaches the last position or the bottom rightmost position on the bottom subscan line. Accordingly, as shown in FIG. 6b, when the matrix window W5 is moved from the top leftmost position on the top main scan line to the bottom rightmost position on the bottom main scan line, the processes of steps S302 and S303 are repeatedly performed for respective pixels.

The detection of the peak density pixel of two dimensions is performed as described above, however, the present invention is not limited to this. The peak density pixel of two dimensions may detected by calculating differential values of the density values in the main scan and subscan directions.

(3-2-4) Area Judgment Process

Figure 9:
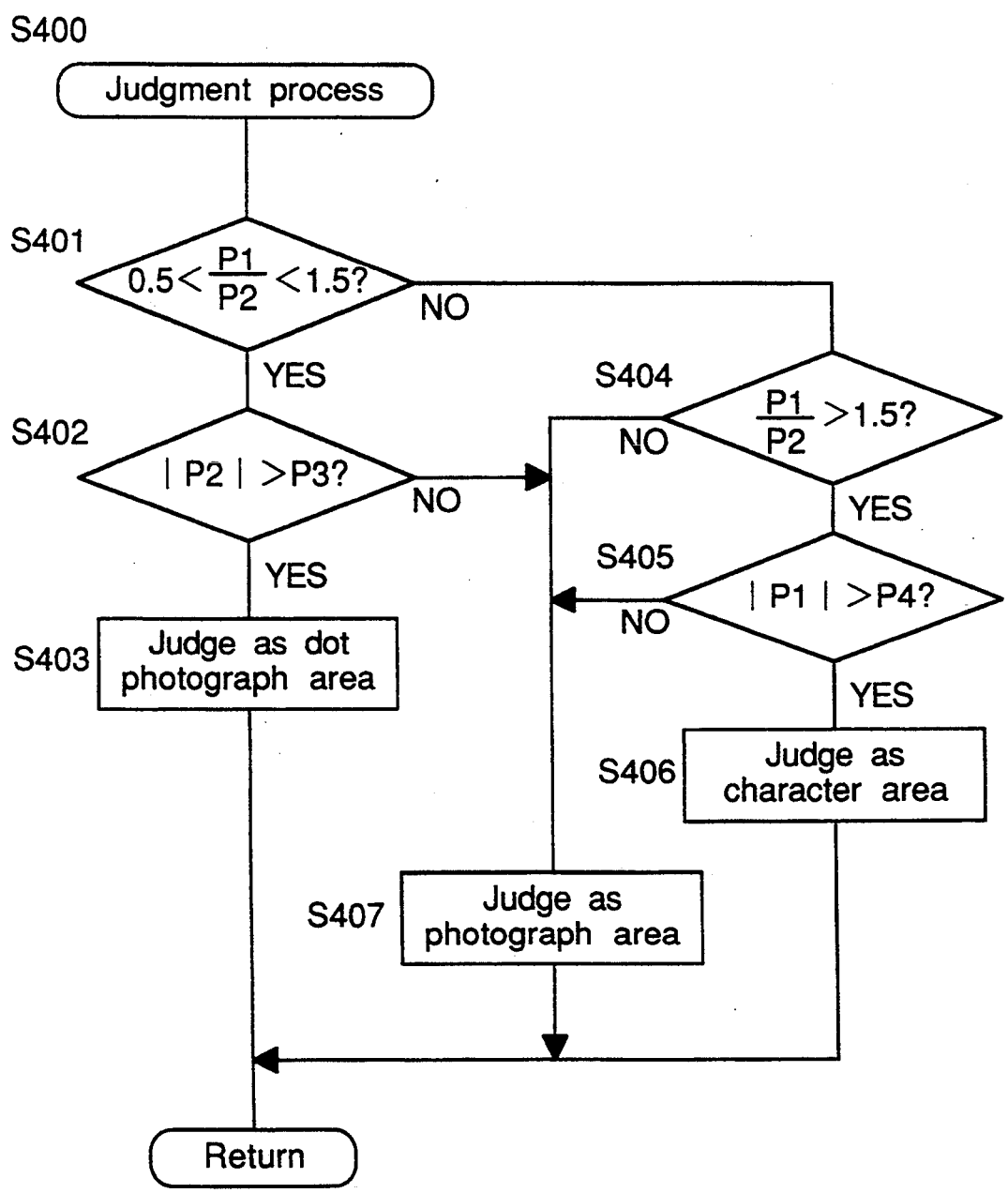
FIG. 9 is a flow chart showing a judgment process of a subroutine shown in FIG. 5.

FIG. 9 is a flow chart showing a judgment process of a subroutine of step S400 shown in FIG. 5.

Generally speaking, the dot photograph image has the following two features. It is known to those skilled in the art that each of the dot photograph images has peak density pixels extremely larger than those of the character image and the photograph image. Further, since each of the dot photograph images is composed of points, it is easily understood that the number P1 of the peak density pixels of one dimension is approximately or substantially equal to the number P2 of the peak density pixels of two dimensions. Furthermore, since a number of peak density pixels changes depending on the contents of the document image to be judged such as the amount of the characters, the kinds of the subject in the case of a photograph image or a dot photograph image or the like, the CPU 300 previously determines not only a threshold value P3 for judging whether the image to be judged is a dot photograph image or a photograph image of the judgment area but also a threshold value P4 for judging whether the image to be judged is a character image or a photograph image, depending on the contents of the image based on predetermined data.

The following area judgment process is performed by the area judgment section 210 using the above-mentioned two features of the dot photograph image and the above-mentioned threshold values P3 and P4, and then, the area judgment section 210 outputs data of the results of the area judgment to the MTF correction section 220 and the binarizing section 230.

<Rule 1> If 0.5<P1/P2<1.5 (YES at step S401) and the absolute value |P2|>P3 (=4 in the preferred embodiment) (YES at step S402), the attribute of the judgment image is judged as the dot photograph image at step S403. In the comparison of step S401, it may be judged whether or not P1/P2 is approximately or substantially equal to one using two threshold values other than 0.5 and 1.5.

<Rule 2> If P1/P2 is larger than 1.5 (YES at step S404) and the absolute value |P1|>P4 (=7 in the present preferred embodiment) (YES at step S405), the attribute of the judgment image is judged as the character image at step S406. In the comparison of step S404, it may be judged whether or not P1/P2 is larger than another threshold value enough larger than one.

<Rule 3> If all the above-mentioned conditions are not satisfied or NO at step S402, S404 or S405, the attribute of the judgment image is judged as the photograph image at step S407.

After completion of the above-mentioned judgment (step S403, S407 and S406), the program flow returns to the original main routine.

(3-2-5) Examples of Area Judgment

Examples of the area judgment process according to the above-mentioned rules will be described below.

Figure 10A:
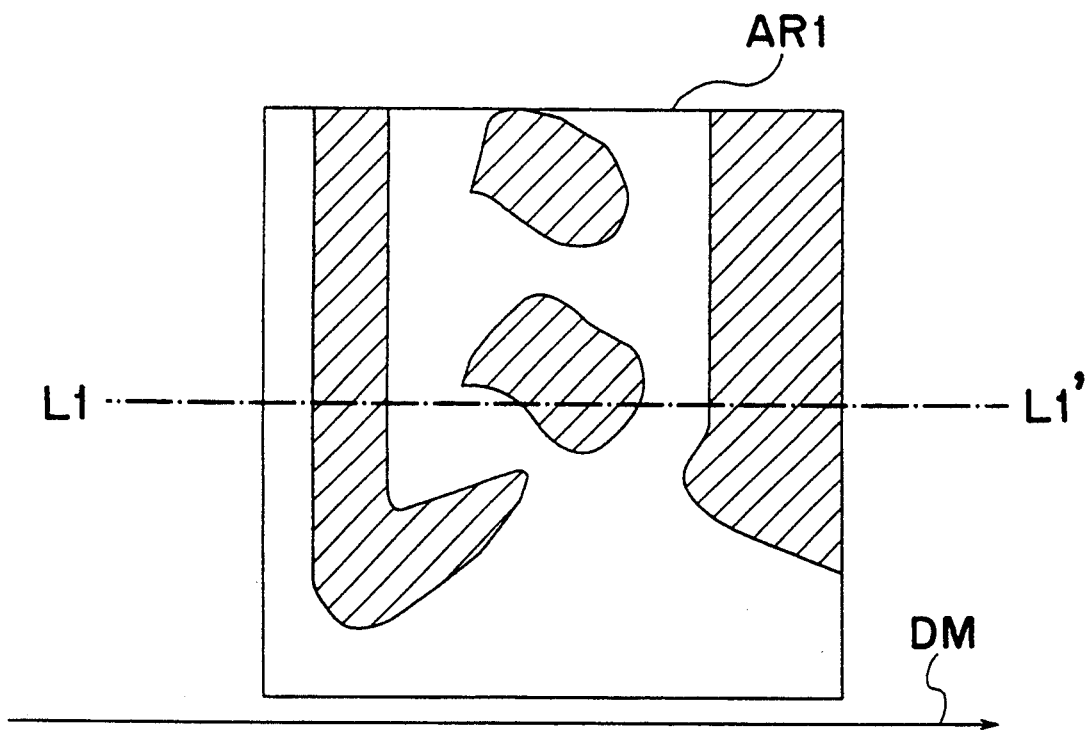
FIG. 10a is a front view showing an example of a character image to be judged.
Figure 10B:
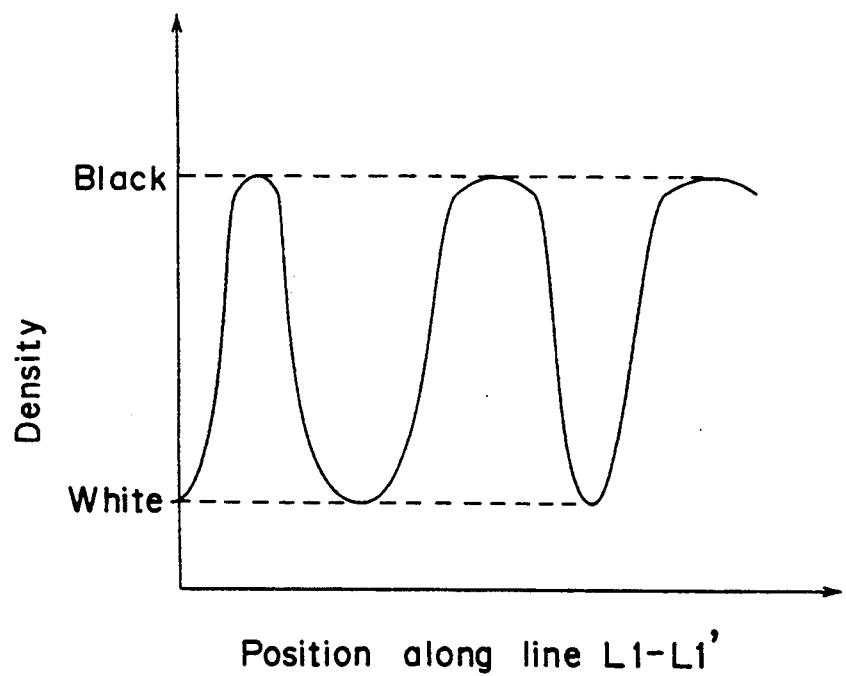
Figure 11A:
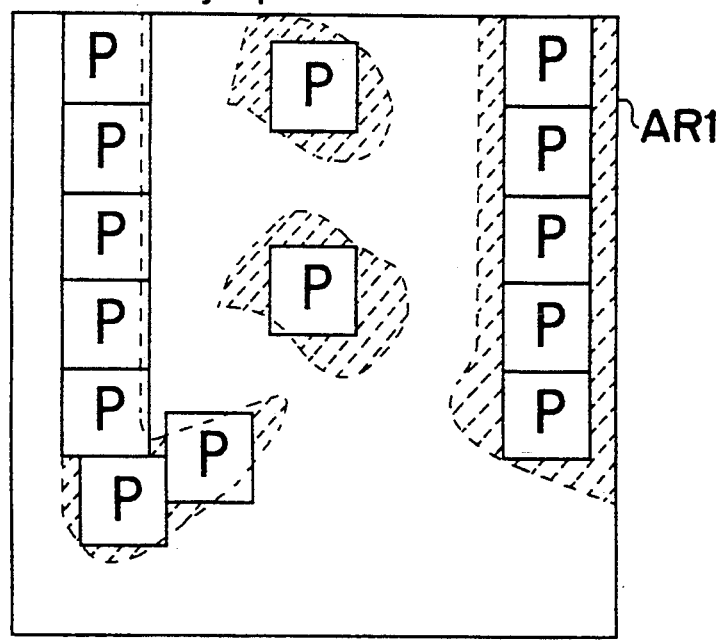
Figure 11B:
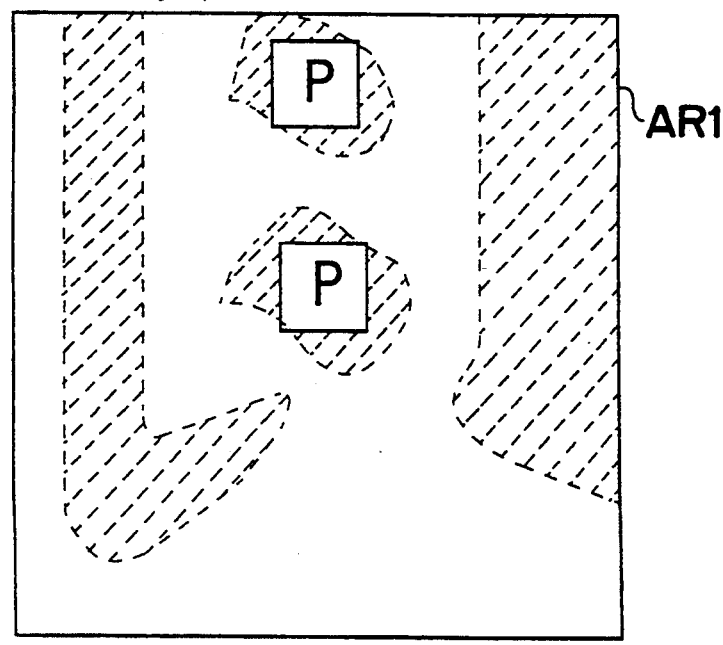

FIG. 10a shows an example of a character image to be judged located in a first area AR1, and FIG. 10b is a graph showing a density of the character image shown in FIG. 10a on a position along a main scan line L1-L1'- shown in FIG. 10a. The area judgment results of the present preferred embodiment for the character image shown in FIG. 10a are shown in FIGS. 11a and 11b. FIG. 11a shows peak density pixels of one dimension obtained by executing the subroutine process of step S200 for the character image shown in FIG. 10a, and FIG. 11b is a front view showing peak density pixels of two dimensions obtained by executing the subroutine process of step S300 for the character image shown in FIG. 10a.

Figure 12A:
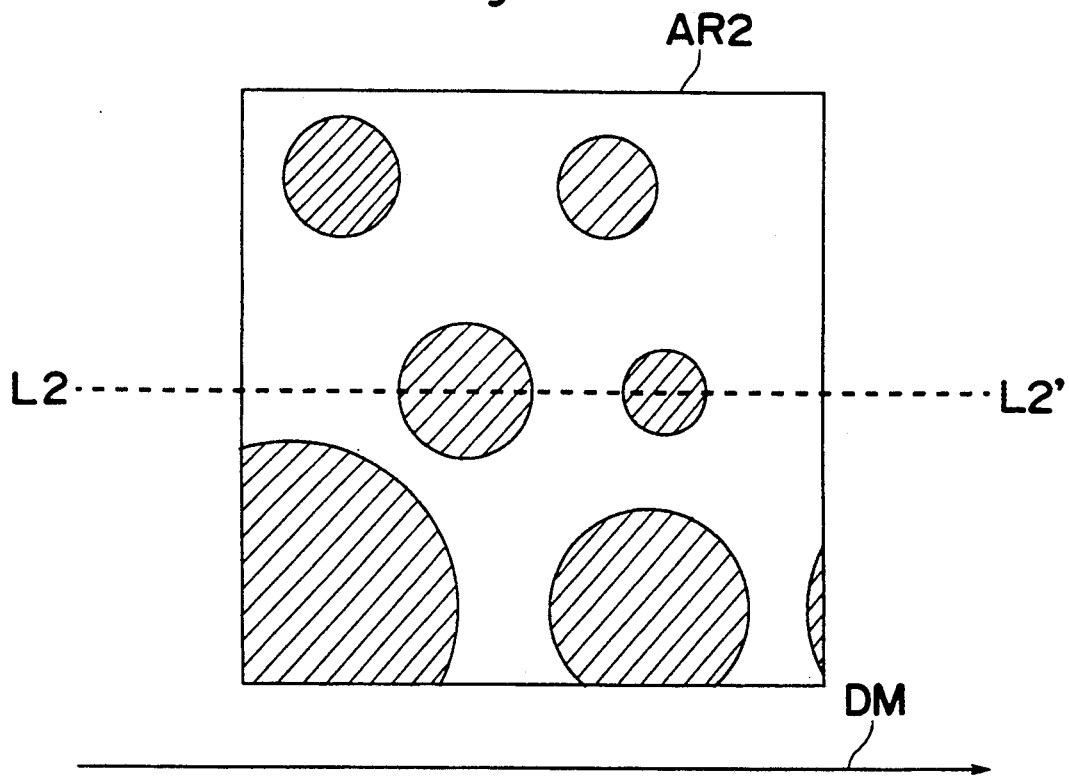
FIG. 12a is a front view showing an example of a dot photograph image to be judged.
Figure 12B:
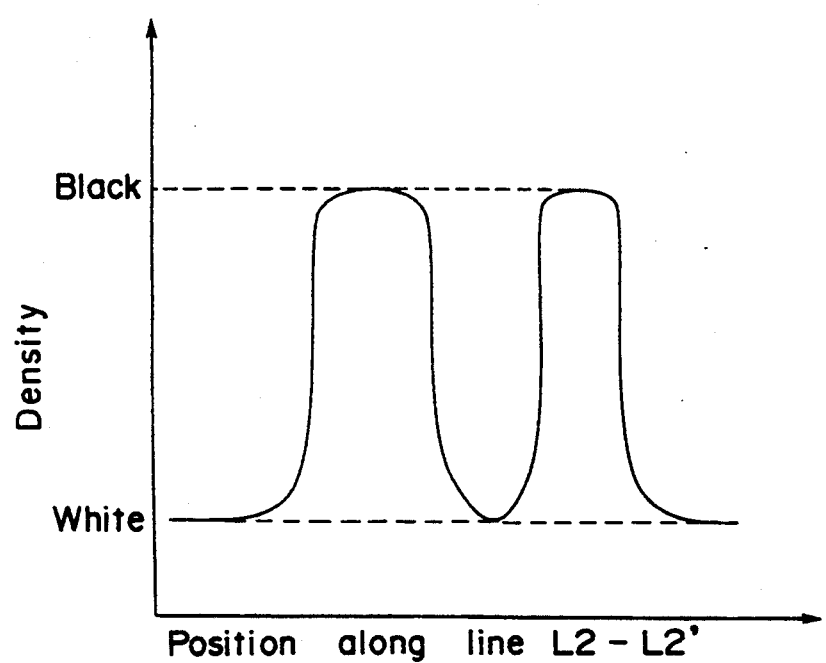
Figure 13A:
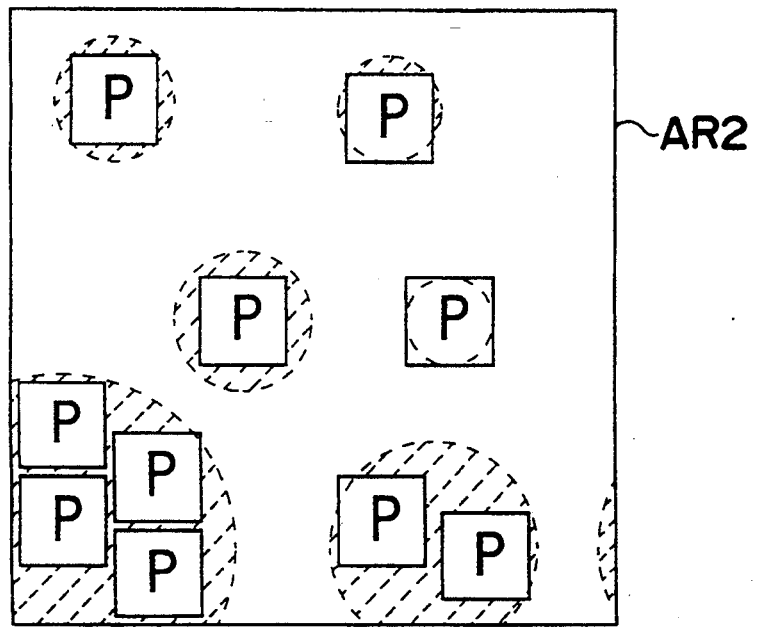
Figure 13B:
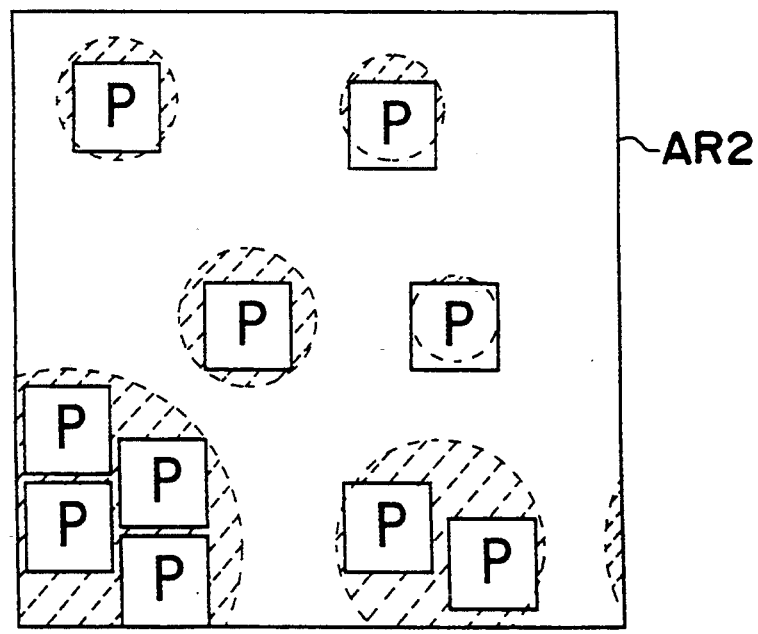

FIG. 12a shows an example of a dot photograph image to be judged located in a second area AR2, and FIG. 12b is a graph showing a density of the dot photograph image shown in FIG. 12a on a position along a main scan line L2–L2' shown in FIG. 12a. The area judgment results of the present preferred embodiment for the dot photograph image shown in FIG. 12a are shown in FIGS. 13a and 13b. FIG. 13a shows peak density pixels of one dimension obtained by executing the subroutine process of step S200 for the dot photograph image shown in FIG. 12a, and FIG. 13b shows peak density pixels of two dimensions obtained by executing the subroutine process of step S300 for the dot photograph image shown in FIG. 12a.

Figure 14A:
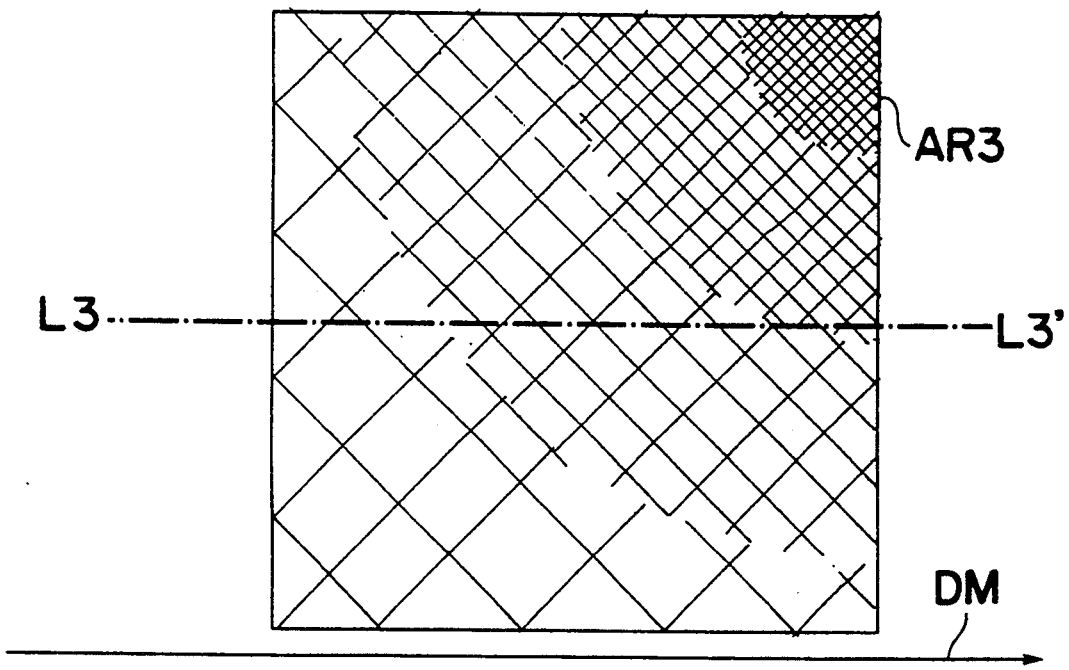
FIG. 14a is a front view showing an example of a photograph image to be judged.
Figure 14B:
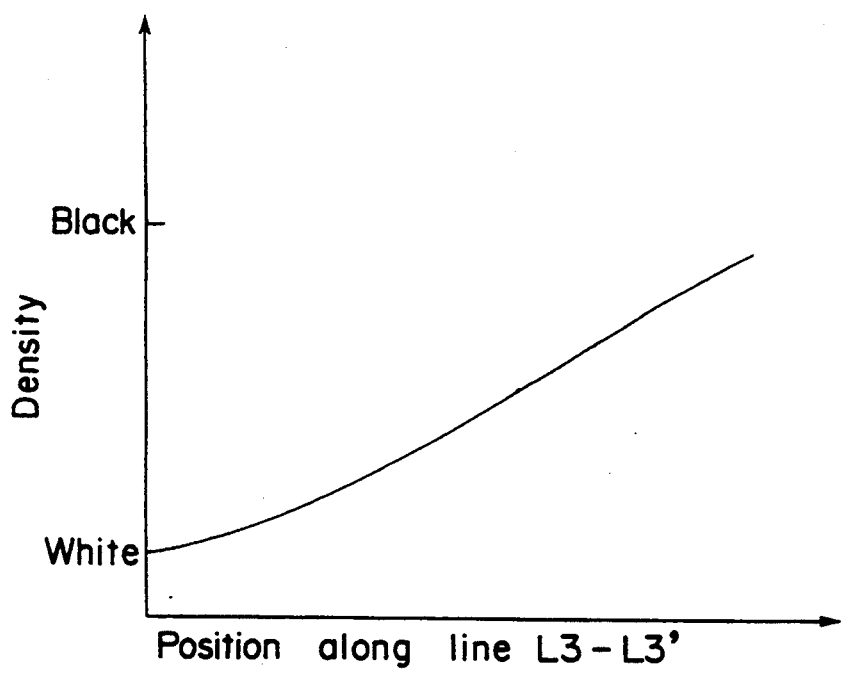
Figure 15A:
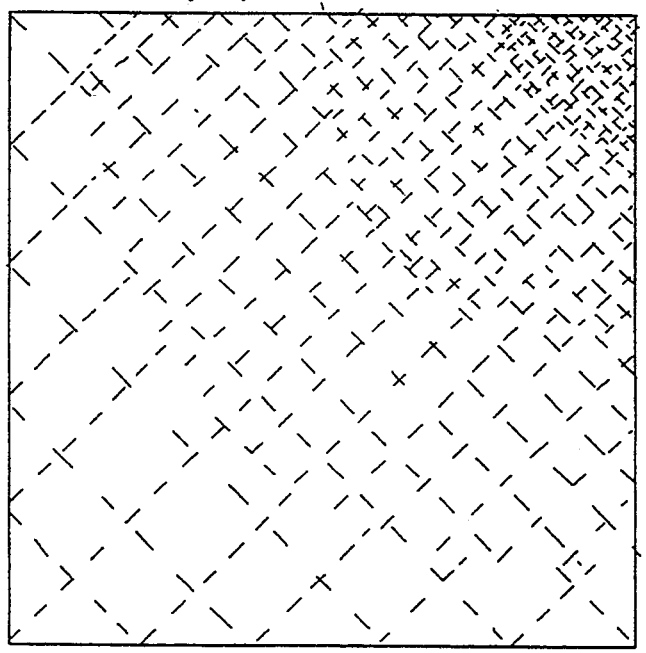
Figure 15B:
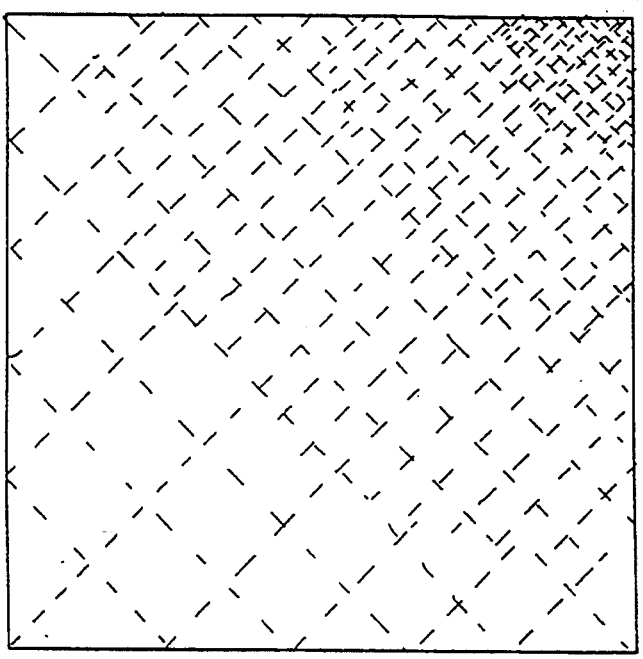

FIG. 14a shows an example of a photograph image to be judged located in a third area AR3, and FIG. 14b is a graph showing a density of the photograph image shown in FIG. 14a on a position along a main scan line L3–L3' shown in FIG. 14a. The area judgment results of the present preferred embodiment for the photograph image shown in FIG. 14a are shown in FIGS. 13a and 13b. FIG. 15a shows peak density pixels of one dimension obtained by executing the subroutine process of step S200 for the photograph image shown in FIG. 14a, and FIG. 15b shows peak density pixels of two dimensions obtained by executing the subroutine process of step S300 for the photograph image shown in FIG. 14a.

As is apparent from FIGS. 11a, 13a and 15a, the numbers of the peak density pixels of one dimension of the first to third areas AR1 to AR3 are 13, 7 and zero, respectively. As is apparent from FIGS. 11b, 13b and 15b, the numbers of the peak density pixels of two dimensions of the first to third areas AR1 to AR3 are 2, 6 and zero, respectively.

The areas where the condition of step S401 of the rule 1 is satisfied are the second and third areas AR2 and AR3. On the other hand, paying attention to the absolute value $|P2|$, the threshold value P3 is set by the CPU 300 so as to be suitable for a number of screen lines and a size of matrix of the window.

In this case, the conditions of steps S410 and S402 of the rule 1 is satisfied in the second area AR2, and then, the image of the second area AR2 is judged as the dot photograph image. However, the conditions of steps S401 and S402 of the rule 1 is not satisfied in the third area AR3, and then, it is judged that the image is not the dot photograph image. Further, the condition of step S404 of the rule 2 is satisfied only in the first area AR1.

Furthermore, since the absolute value $|P1|>$ the threshold value P4=7 in the first area AR1 or another condition of step S405 of the rule 2 is satisfied in the first area AR1, it is judged as the character image. Further, if such a condition of the rule 3 that "all the above-mentioned conditions are not satisfied" is satisfied or NO at step S402, S404 or S405, the image is judged as the photograph image.

The image data of the document image processed by the area judgment section 210 are outputted together with the attribute signals of the judgment results for the respective judgment areas G1 to G81 as shown in FIG. 16. These image data having the attribute signals are outputted to the MTF correction section 220 and the binarizing section 230, and then, the judgment process by the area judgment section 210 is completed.

(3-2-6) Modification of Area Judgment Process

Figure 17:
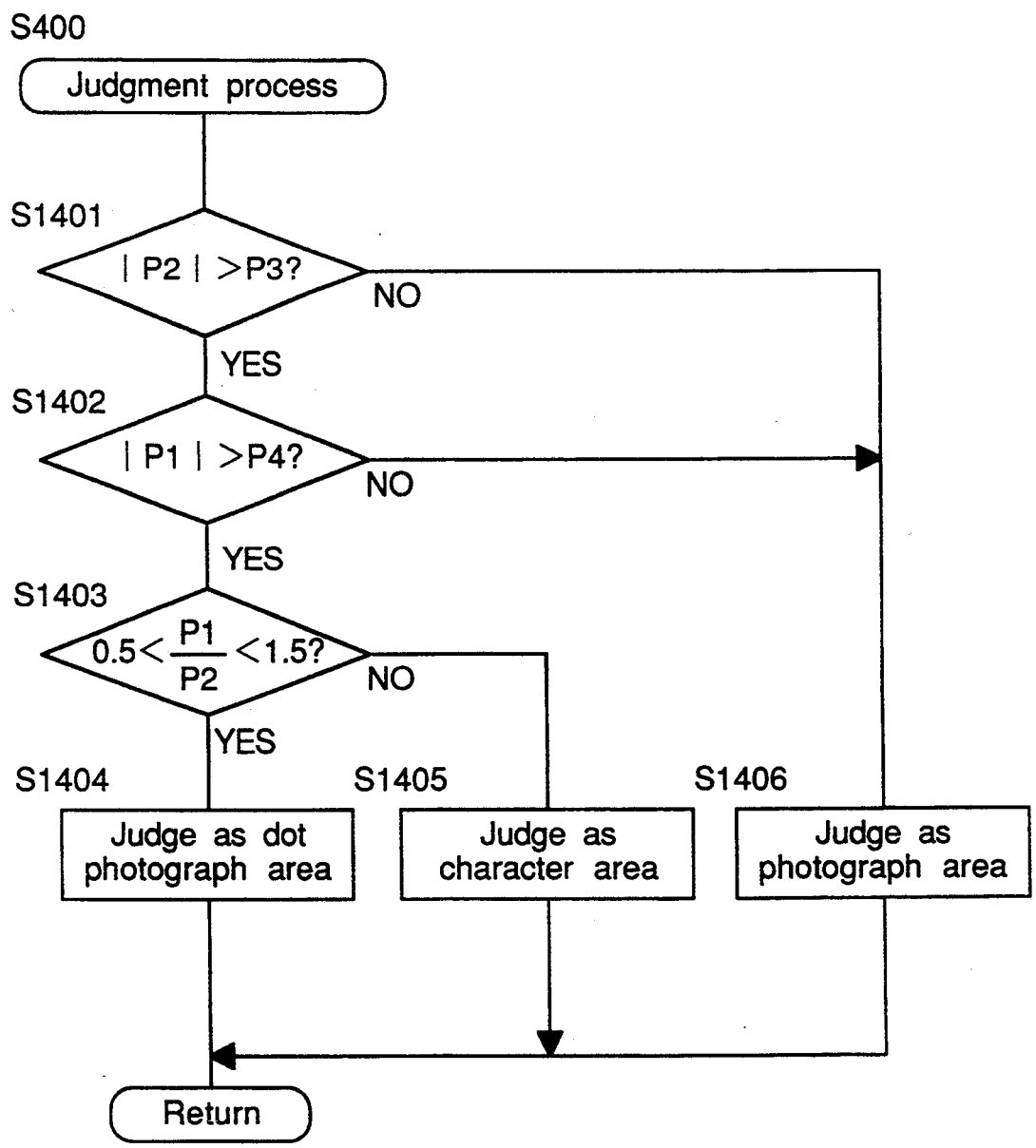
FIG. 17 is a flow chart showing a modified judgment process of a subroutine shown in FIG. 5.

FIG. 17 is a flow chart showing a modified judgment process of a subroutine of step S400 shown in FIG. 5.

The modified judgment process is characterized in that, after judging whether or not the image of the judgment area is the photograph image at steps S1401 and S1402, and then, it is judged whether the image of the judgment area is either the character image or the dot photograph image at step S1403.

Referring to FIG. 17, first of all, if the absolute value $|P2| \leq$ the threshold value P3 (NO at step S1401), the program flow proceeds to step S1406, the image of the judgment area is judged as the photograph image, and then, the program flow returns to the original main routine. Further, if the absolute value $|P2|>$ the threshold value P3 (YES at step S1401) but the absolute value $|P1| \leq$ the threshold value P4 (NO at step S1402), the program flow proceeds to step S1406.

In the case of the absolute value $|P1|>$ the threshold value P4 (YES at step S1402), if 0.5 < P1/P2 1.5 (YES at step S1403), the program flow proceeds to step S1404, the image of the judgment area is judged as the dot photograph image, and then, the program flow returns to the original main routine. On the other hand, if $P1/P2 \leq 0.5$ or $P1/P2 > 1.5$ (NO at step S1403), the program flow proceeds to step S1405, the image of the judgment area is judged as the character image, and then, the program flow returns to the original main routine.

In the comparison of step S1403, it may be judged whether or not P1/P2 is substantially or approximately equal to one using the other threshold values.

As is apparent from the above description, the image process apparatus of the present preferred embodiment comprising the area judgment section 210 has the following advantageous effects.

(a) It is unnecessary to perform a large-scaled calculation such as the case of the conventional apparatus using the autocorrelation function, and the embodiment apparatus has a structure simpler than that of the conventional apparatus.

(b) The embodiment apparatus can perform the area judgement process including judgment of dot photograph image area with a higher precision. Therefore, when image processings suitable for respective image characteristics such as binarizing methods are performed based on the results of the area judgement, a higher quality of image data can be obtained after the image processings.

In the present preferred embodiment, in such a case that an image of a judgment area is a reversed white-and-black monochrome image, it is necessary to convert the reversed monochrome image into the original monochrome image and perform the following counting and judgment process. Alternatively, a specified pixel when the density value of the specified pixel is smaller than the sum of each of the density values of the peripheral pixels, which are located in one direction preselected among the main scan direction and the subscan direction or two directions of the main scan direction and the subscan direction, and a predetermined value is counted as a negative peak density pixel of one dimension or two dimensions. Thereafter, an area judgment process may be performed based on the numbers of the negative peak density pixels of one dimension and two dimensions in a manner similar to that of the above-mentioned method.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processing apparatus comprising:
   means for generating pixels from a document image;
   first pixel detecting means for comparing each pixel in a one-dimension direction to a predetermined constant density and identifying each of said pixels having a peak density in the one-dimension direction larger than the predetermined constant density from image data located in a predetermined image area of the document image;
   second pixel detecting means for comparing each pixel in a one-dimension direction to the predetermined constant density and identifying each of said pixels having peak densities in the two-dimension directions larger than the predetermined constant density from said image data;
   first counting means for counting a number of said first peak density pixels of one dimension identified by said first pixel detecting means;
   second counting means for counting a number of said second peak density pixels of two dimensions identified by said second pixel detecting means;
   means for selecting an image processing method based on said number counted by said first counting means and said number counted by said second counting means; and
   means for processing said image data according to the image processing method selected by said selecting means;
   wherein the first and second pixel detecting means are coupled to the pixel generating means.

2. The apparatus as claimed in claim 1, wherein said selecting means includes means for comparing the number of said first peak density pixels of one dimension with the number of second peak density pixels of two dimensions.

3. The apparatus as claimed in claim 2, wherein said selecting means includes means for comparing the number of said first peak density pixels of one dimension with a first predetermined value.

4. The apparatus as claimed in claim 3, wherein said selecting means includes means for comparing the number of said second peak density pixels of two dimensions with a second predetermined value.

5. The apparatus as claimed in claim 4, wherein said selecting means includes means for selecting a dot image processing method when the number of first peak density pixels is approximately equal to the number of second peak density pixels and the number of second peak density pixels is greater than said second predetermined value.

6. The apparatus as claimed in claim 4, wherein said selecting means includes means for selecting a character image processing method when the number of first peak density pixels is not approximately equal to the number of second peak density pixels and the number of first peak density pixels is greater than said first predetermined value.

7. The apparatus as claimed in claim 1, wherein said selecting means includes means for comparing the number of said first peak density pixels of one dimension with a first predetermined value.

8. The apparatus as claimed in claim 7, wherein said selecting means includes means for comparing the number of said second peak density pixels of two dimensions with a second predetermined value.

9. The apparatus as claimed in claim 1,
   wherein the pixel generating means is a CCD image reader.

10. An image processing apparatus comprising:
    means for generating pixels from a document image;
    first pixel detecting means for comparing each pixel in a one-dimension direction to a predetermined constant density and identifying each of said pixels having a peak density in the one-dimension direction larger than the predetermined constant density from image data located in a predetermined image area of the document image;
    second pixel detecting means for comparing each pixel in two-dimension directions to the predetermined constant density and identifying each of said pixels having peak densities in the two-dimension directions larger than the predetermined constant density from said image data;
    first counting means for counting a number of said first peak density pixels of one dimension identified by said first pixel detecting means;
    second counting means for counting a number of said second peak density pixels of two dimensions identified by said second pixel detecting means;
    means for selecting an image processing method by comparing the number counted by said first counting means with a predetermined first threshold value and comparing the number counted by said second counting means with a predetermined second threshold value; and
    means for processing said image data according to the image processing method selected by said selecting means;
    wherein the first and second pixel detecting means are coupled to the pixel generating means.

11. The apparatus as claimed in claim 10, wherein said selecting means includes means for comparing the number of said first peak density pixels of one dimension with the number of second peak density pixels of two dimensions.

12. The apparatus as claimed in claim 11, wherein said selecting means includes means for comparing the number of said first peak density pixels of one dimension with a first predetermined value.

13. The apparatus as claimed in claim 12, wherein said selecting means includes means for comparing the number of said second peak density pixels of two dimensions with a second predetermined value.

14. The apparatus as claimed in claim 13, wherein said selecting means includes means for selecting a dot image processing method when the number of first peak density pixels is approximately equal to the number of second peak density pixels and the number of second peak density pixels is greater than said second predetermined value.

15. The apparatus as claimed in claim 13, wherein said selecting means includes means for selecting a character image processing method when the number of first peak density pixels is not approximately equal to the number of second peak density pixels and the number of first peak density pixels is greater than said first predetermined value.

16. The apparatus as claimed in claim 10, wherein said selecting means includes means for comparing the number of said first peak density pixels of one dimension with a first predetermined value.

17. The apparatus as claimed in claim 16, wherein said selecting means includes means for comparing the number of said second peak density pixels of two dimensions with a second predetermined value.

18. The apparatus as claimed in claim 10 wherein the pixel generating means is a CCD image reader.

19. An image processing apparatus comprising:
means for generating pixels from an image;
first detecting means for detecting an image density of each pixel of the image in a first direction;
first comparing means for comparing said image density detected by said first detecting means with a predetermined constant value and for outputting a signal when said image density is larger than said predetermined constant value;
first counting means for counting a number of said signals output by said first comparing means;
second detecting means for detecting said image density of each pixel of said image in a second direction different from said first direction;
second comparing means for comparing said image density detected by said second detecting means with said predetermined constant value and for outputting a signal when said image density is larger than said predetermined constant value;
second counting means for counting a number of said signals output by said second comparing means;
judging means for judging a kind of said image based on the numbers counted by said first counting means and said second counting means; and
processing means for performing an image processing based on a judgment result of said judging means;
wherein the first and second detecting means are coupled to the pixel generating means.

20. The apparatus as claimed in claim 19,
wherein said judging means judges that said image is a dot photograph image when said number counted by said first counting means is substantially equal to said number counted by said second counting means and said number counted by said first counting means is larger than a second predetermined value.

21. The apparatus as claimed in claim 20,
wherein said judging means judges that said image is a photograph image, when said number counted by said first counting means is substantially equal to said number counted by said second counting means and said number counted by said first counting means is smaller than said second predetermined value.

22. The apparatus as claimed in claim 20,
wherein said predetermined value is used for judging whether said image is a dot photograph or a photograph image.

23. The apparatus as claimed in claim 19,
wherein said judging means judges that said image is a character image when said number counted by said first counting means is larger than said number counted by said second counting means and said number counted by said first counting means is larger than a second predetermined value.

24. The apparatus as claimed in claim 23,
wherein said judging means judges that said image is a photograph image, when said number counted by said first counting means is substantially equal to said number counted by said second counting means and said number counted by said first counting means is smaller than said second predetermined value.

25. The apparatus as claimed in claim 23,
wherein said second predetermined value is used for judging whether said image is a character image or a photograph image.

26. The apparatus as claimed in claim 19,
wherein the pixel generating means is a CCD image reader.

27. An image processing apparatus comprising:
means for generating pixels from an image;
detecting means for detecting an image density of each pixel of the image;
first finding means for finding for each pixel a first difference of said image density between said each pixel and other pixels existing in a first direction in said image density detected by said detecting means;
first comparing means for comparing a predetermined constant value with said first difference of said image density for each pixel and for outputting a signal when said first difference is larger than said predetermined constant value;
first counting means for counting a number of said signals output by said first comparing means;
second finding means for finding for each pixel a second difference of said image density between said each pixel and other pixels existing in a second direction in said image density detected by said detecting means;
second comparing means for comparing the predetermined constant value to said second difference of said image density and for outputting a signal when said second difference is larger than said predetermined constant value;
second counting means for counting a number of said signals output by said second comparing means;
judging means for judging a kind of said image based on the numbers counted by said first counting means and said second counting means; and
processing means for performing an image processing based on a judgment result of said judging means;
wherein the detecting means is coupled to the pixel generating means.

28. The apparatus as claimed in claim 27,
wherein said judging means judges that said image is a dot photograph image when said number counted by said first counting means is substantially equal to said number counted by said second counting means and said number counted by said first counting means is larger than a second predetermined value.

29. The apparatus as claimed in claim 28,
wherein said judging means judges that said image is a photograph image, when said number counted by said first counting means is substantially equal to said number counting means and said number counted by said first counting means is smaller than said second predetermined value.

30. The apparatus as claimed in claim 28, wherein said second predetermined value is used for judging whether said image is a dot photograph image or a photograph image.

31. The apparatus as claimed in claim 27, wherein said judging means judges that said image is a character image when said number counted by said first counting means is larger than said number counted by said second counting means and said number counted by said first counting means is larger than a second predetermined valued.

32. The apparatus as claimed in claim 31, wherein said judging means judges that said image is a photograph image when said number counted by said second counting means and said number counted by said first counting means is larger than said number counted by said second counting means and said number counted by said first counting means is smaller than said second predetermined value.

33. The apparatus as claimed in claim 31, wherein said second predetermined value is used for judging whether said image is a character image or a photograph image.

34. The apparatus as claimed in claim 27, wherein the pixel generating means is a CCD image reader.

35. An image processing apparatus for judging whether an image is a dot photograph image or a character image and for performing an image processing, comprising:
    means for generating pixels from the image;
    first detecting means for detecting an image density of each pixel of the image in a first direction;
    first comparing means for comparing said image density detected by said first detecting means with a predetermined constant value and for outputting a signal when said image density is larger than said predetermined value;
    first counting means for counting a number of said signals output by said first comparing means;
    second detecting means for detecting said image density of each pixel of said image in a second direction different from said first direction;
    second comparing means for comparing said image density detected by said second detecting means with said predetermined constant value and for outputting a signal when said image density is larger than said predetermined constant value;
    second counting means for counting a number of said signals output by said second comparing means;
    judging means for judging that said image is a dot photograph image when said number counted by said first counting means and said number counted by said second counting means are substantially equal and for judging that said image is a character image when said number counted by said first counting means and said number counted by said second counting means are different; and
    processing means for performing an image processing based on a judgment result of said judging means;
    wherein the first and second detecting means are coupled to the pixel generating means.

36. The apparatus as claimed in claim 35, wherein the pixel generating means is a CCD image reader.

37. An image processing apparatus comprising:
    means for receiving pixels for a document image;
    first pixel detecting means for comparing each pixel in a one-dimension direction to a predetermined constant density and identifying each of said pixels having a peak density in the one-dimension direction larger than the predetermined constant density from image data located in a predetermined image area of the document image;
    second pixel detecting means for comparing each pixel in a one-dimension direction to the predetermined constant density and identifying each of said pixels having peak densities in the two-dimension directions larger than the predetermined constant density from said image data;
    first counting means for counting a number of said first peak density pixels of one dimension identified by said first pixel detecting means;
    second counting means for counting a number of said second peak density pixels of two dimensions identified by said second pixel detecting means;
    means for selecting an image processing method based on said number counted by said first counting means and said number counted by said second counting means; and
    means for processing said image data according to the image processing method selected by said selecting means;
    wherein the first and second detecting means are coupled to the pixel receiving means.

38. An image processing apparatus comprising:
    means for receiving pixels for a document image;
    first pixel detecting means for comparing each pixel in a one-dimension direction to a predetermined constant density and identifying each of said pixels having a peak density in the one-dimension direction larger than the predetermined constant density from image data located in a predetermined image area of the document image;
    second pixel detecting means for comparing each pixel in two-dimension directions to the predetermined constant density and identifying each of said pixels having peak densities in the two-dimension directions larger than the predetermined constant density from said image data;
    first counting means for counting a number of said first peak density pixels of one dimension identified by said first pixel detecting means;
    second counting means for counting a number of said second peak density pixels of two dimensions identified by said second pixel detecting means;
    means for selecting an image processing method by comparing the number counted by said first counting means with a predetermined first threshold value and comparing the number counted by said second counting means with a predetermined second threshold value; and
    means for processing said image data according to the image processing method selected by said selecting means;
    wherein the first and second detecting means are coupled to the pixel receiving means.

39. An image processing apparatus comprising:
    means for receiving pixels for an image;
    first detecting means for detecting an image density of each pixel of the image in a first direction;
    first comparing means for comparing said image density detected by said first detecting means with a predetermined constant value and for outputting a signal when said image density is larger than said predetermined constant value;

first counting means for counting a number of said signals output by said first comparing means;

second detecting means for detecting said image density of each pixel of said image in a second direction different from said first direction;

second comparing means for comparing said image density detected by said second detecting means with said predetermined constant value and for outputting a signal when said image density is larger than said predetermined constant value;

second counting means for counting a number of said signals output by said second comparing means;

judging means for judging a kind of said image based on the numbers counted by said first counting means and said second counting means; and processing means for performing an image processing based on a judgment result of said judging means;

wherein the first and second detecting means are coupled to the pixel receiving means.

40. An image processing apparatus comprising:

means for receiving pixels for a document image;

detecting means for detecting an image density of each pixel of the image;

first finding means for finding for each pixel a first difference of said image density between said each pixel and other pixels existing in a first direction in said image density detected by said detecting means;

first comparing means for comparing a predetermined constant value with said first difference of said image density for each pixel and for outputting a signal when said first difference is larger than said predetermined constant value;

first counting means for counting a number of said signals output by said first comparing means;

second finding means for finding for each pixel a second difference of said image density between said each pixel and other pixels existing in a second direction in said image density detected by said detecting means;

second comparing means for comparing the predetermined constant value to said second difference of said image density and for outputting a signal when said second difference is larger than said predetermined constant value;

second counting means for counting a number of said signals output by said second comparing means;

judging means for judging a kind of said image based on the numbers counted by said first counting means and said second counting means; and processing means for performing an image processing based on a judgment result of said judging means;

wherein the detecting means is coupled to the pixel receiving means.

41. An image processing apparatus for judging whether an image is a dot photograph image or a character image and for performing an image processing, comprising:

means for receiving pixels for the image;

first detecting means for detecting an image density of each pixel of the image in a first direction;

first comparing means for comparing said image density detected by said first detecting means with a predetermined constant value and for outputting a signal when said image density is larger than said predetermined value;

first counting means for counting a number of said signals output by said first comparing means;

second detecting means for detecting said image density of each pixel of said image in a second direction different from said first direction;

second comparing means for comparing said image density detected by said second detecting means with said predetermined constant value and for outputting a signal when said image density is larger than said predetermined constant value;

second counting means for counting a number of said signals output by said second comparing means;

judging means for judging that said image is a dot photograph image when said number counted by said first counting means and said number counted by said second counting means are substantially equal and for judging that said image is a character image when said number counted by said first counting means and said number counted by said second counting means are different; and processing means for performing an image processing based on a judgment result of said judging means;

wherein the first and second detecting means are coupled to the pixel receiving means.

* * * * *